United States Patent [19]

Kotoh et al.

[11] 4,186,396
[45] Jan. 29, 1980

[54] RADAR BEACON APPARATUS

[75] Inventors: Keigo Kotoh; Akiyoshi Morinaka, both of Amagasaki, Japan

[73] Assignee: Mitsubishi Denki Kabushiki Kaisha, Tokyo, Japan

[21] Appl. No.: 901,087

[22] Filed: Apr. 28, 1978

[51] Int. Cl.² .......................... G01S 9/56; H01Q 21/00
[52] U.S. Cl. .................. 343/6.8 R; 343/770; 343/771; 343/893
[58] Field of Search ............... 343/6.8 R, 770, 771, 343/893

[56]  References Cited
U.S. PATENT DOCUMENTS

| 2,561,421 | 7/1951 | Seale et al. ............... 343/6.8 R |
| 2,947,987 | 8/1960 | Dodington ............... 343/893 X |
| 2,971,188 | 2/1961 | Bryan ............... 343/6.8 R |
| 3,005,984 | 10/1961 | Winter et al. ............... 343/770 X |
| 3,171,094 | 2/1965 | Geren et al. ............... 343/6.8 R X |
| 3,346,865 | 10/1967 | Jones, Jr. ............... 343/771 |
| 3,432,853 | 3/1969 | Wise ............... 343/6.8 R |
| 3,638,224 | 1/1972 | Bailey et al. ............... 343/893 X |

FOREIGN PATENT DOCUMENTS 725386   3/1955   United Kingdom ............... 343/771

Primary Examiner—Malcolm F. Hubler
Attorney, Agent, or Firm—Oblon, Fisher, Spivak, McClelland & Maier

[57] ABSTRACT

A radar beacon apparatus comprises a slot antenna for transmitting and a slot antenna for receiving which are respectively disposed in the substantially same axial direction and a transmitting unit and a receiving unit which are respectively connected to each end in the axial direction of the slot antenna as body parts. The body part is outwardly covered with a radar dome case made of a transparent sphere of waves (radio permeable material).

12 Claims, 5 Drawing Figures

RADAR BEACON APPARATUS

BACKGROUND OF THE INVENTION

The present invention relates to a radar beacon apparatus.

In a shipwreck, sufferers usually get in a lifeboat, however, the information of the position of the lifeboat may be lost. This is depending upon the weather condition and the sea condition at the shipwreck.

The lifeboat in the sea is quite small whereby it is not easily found from the rescue ship.

The lifeboat usually equips optical or acoustic signal devices such as a signal red flame, a signal with a parachute, a sunlight signal mirror, a light and a pipe as signal devices for rescue. These signal devices should be used under the decision made by the sufferers.

Recently, radio wave signal devices for rescue have been proposed to overcome the problem. It has been proposed to use a radio wave oscillating device which always sweeps in the frequency band zone for radars in ships and a repeater type radio wave oscillating device which automatically generates the corresponding rescue signal when the pulse radio wave of a radar in a ship is received.

When these devices are used, the sufferers can not know whether the rescue activity has started or not.

It is important from the viewpoint of the life saving, that the devices can be equipped with a large lifeboat, a life buoy for few persons or a life jacket, for a short time without failure and the devices should not have radio interference for transmitting and receiving and the devices should be durable, water resistant, air-tight and reliable.

However, a radar beacon apparatus having all of these characteristics have not been found. It is important to develop such apparatus from the viewpoint of speedy and precise rescue activity.

SUMMARY OF THE INVENTION

It is an object of the present invention to provide a radar beacon apparatus which is used for easy, speedy and precise rescue activity in a shipwreck.

It is another object of the present invention to provide a radar beacon apparatus which has no interference in the transmission and the receiving.

It is the other object of the present invention to provide a radar beacon apparatus which can be equipped in speedy, precise and easy.

The other object of the present invention is to provide a radar beacon apparatus having a simple structure in light weight.

The other object of the present invention is to provide a radar beacon apparatus having excellent durability, water resistance anticorrosion and air-tightness.

The foregoing and other objects of the present invention have been attained by providing a radar beacon apparatus which comprises a slot antenna for transmitting and a slot antenna for receiving which are respectively disposed in substantially same axial direction; and a transmitting unit and a receiving unit which are respectively connected to each end in the axial direction of the slot antenna; and said slot antennae and said transmitting unit and said receiving unit as body parts being outwardly covered with a radar dome case made of a transparent sphere of waves (radio permeable material) such as plastics.

DETAILED DESCRIPTION OF THE PREFERRED EMBODIMENTS

Figure 1:
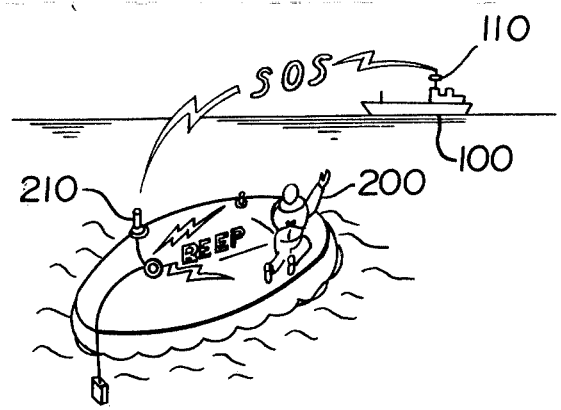
FIG. 1 is a schematic view for illustrating one example of a rescue system in which the radar beacon apparatus of the present invention is used.

Referring to the drawings, certain embodiments of the present invention will be illustrated.

FIG. 1 shows one example of a rescue system in which the radar beacon apparatus of the present invention is used.

In FIG. 1, a rescue boat (100) equips a search radar (110) for a ship. A radar beacon apparatus (210) of the present invention is equipped with a life buoy (200) in which sufferers are got.

When the radar wave of the search radar in the rescue ship (100) is transmitted, the radar wave is detected by the receiving unit in the radar beacon apparatus (210) whereby the transmitting unit equipped in the radar beacon apparatus (210) is automatically actuated by the detected signals to transmit the responding wave for sweeping, for plural times, in the frequency band zone including the frequency of the search radar (110) of the rescue ship (100) (for example 9,300 to 9,500 MHz).

Figure 2:
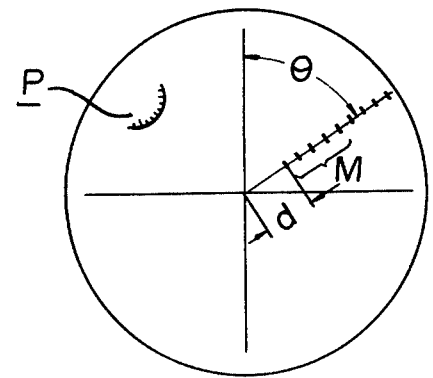
FIG. 2 is a pattern indicated on a radar PPI indication of a search radar in the operation of the rescue system.

The sweep responding wave is received by the search radar (110) and a dotted line M which is different from the echo P, is indicated on the PPI indicator of the search radar (110) as shown in FIG. 2 under outputting at each time corresponding the frequency of the responding wave to the frequency of the receiving wave of the search radar (110). The indication shows the direction θ and the distance d of the life buoy from the rescue boat (110) whereby the speedy and effective rescue activity can be performed.

Figure 3:
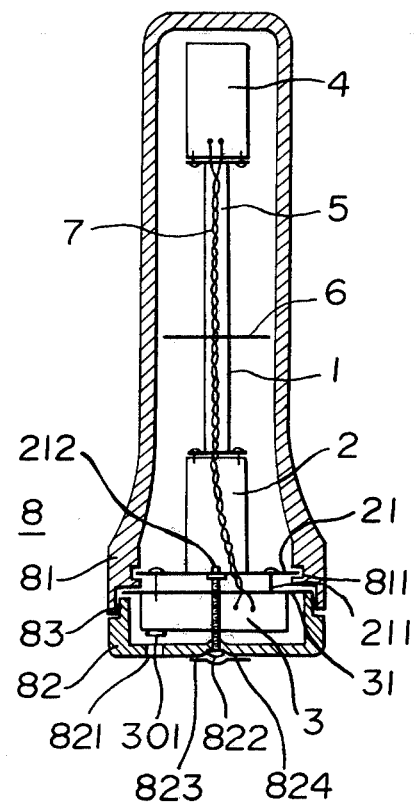
FIG. 3 is a sectional view of one embodiment of the radar beacon apparatus of the present invention.

FIG. 3 shows one embodiment of the structure of the radar beacon apparatus of the present invention which is used in the rescue system.

Figure 5:
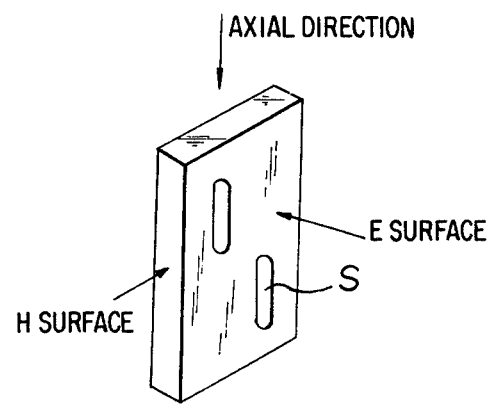
FIG. 5 is a schematic view of one embodiment of a slot antenna used in the radar beacon apparatus.

In FIG. 3, the reference numeral (1) designates a receiving antenna which is a slot antenna having a specific slot S on the relatively wide E surface of a wave guide as shown in FIG. 5.

In order to give substantial non-directivity for the horizontal directivity and to miniaturize a size, the ratio of the size of the relatively narrow H surface to that of E surface of the wave guide is smaller than the ratio in the conventional wave guide which is about 0.5.

The reference numeral (2) designates a receiving unit which is connected to one edge surface of the receiving antenna (1) in the axial direction and which leads the radar wave fed through the receiving antenna (1) to detect the radar wave whereby the radar pulse signal transmitted from the rescue ship (100) is detected.

Thus, the receiving unit (2) is connected to the edge surface of the receiving antenna (1) in the axial direction whereby the disorder of the field caused by the receiving unit is small and the disorder of the antenna pattern is significantly small. Moreover, the electric loss is small because the receiving unit (2) is directly connected to the receiving antenna.

The receiving unit (2) is shielded to prevent an erroneous operation caused by directly receiving outer other radio waves in the receiving unit (2). An additional circuit (3) comprises a circuit for generating a control signal for feeding to the transmitting unit (4) and the indicating unit (not shown) by the radar pulse signal detected in the receiving unit (2) and a circuit for controlling a power feeding from a power source (not shown) to the transmitting unit (4). The transmitting unit (4) transmits the sweep responding wave for repeatedly sweeping the specific frequency band zone including the frequency of the search radar (110) at a specific rate under the control from the additional circuit (3).

The reference numeral (5) designates a transmitting antenna which is a slot antenna having the similar type wave guide of the receiving antenna (1) and which radiates the sweep responding wave generated in the transmitting unit (4).

The transmitting unit (4) is connected to one edge surface of the transmitting antenna (5) in the axial direction and it prevents the disorder of the pattern of the radiation from the transmitting antenna (5) and it directly connected to the transmitting antenna (5) to reduce the coupling loss. The other edge surface of the transmitting antenna (5) is contacted with the other edge surface of the receiving antenna (1) in one axial direction. The arrangement of them in one axial direction results to reduce the mutual electric coupling between the transmitting antenna and the receiving antenna and to reduce contamination between the transmitting wave and the receiving wave and to prevent the disorder of the antenna pattern. Moreover, the transmitting unit, the receiving unit and the transmitting antenna and the receiving antenna can be formed in one body whereby the cost can be effectively lowered.

A shield plate (6) is disposed for further reducing the electric coupling between the transmitting antenna (5) and the receiving antenna (1). A wiring (7) connects the transmitting unit (4) and the additional circuit (3) along one surface of the wave guide for forming the transmitting antenna (5) and the receiving antenna (1). Thus, when the wiring (7) is given along the H surface of the wave guide, the disorder of the antenna pattern caused by the wiring (7) can be significantly reduced.

A radar dome case (8) has a structure having a long hollow shape at the upper part and a skirt at the lower part for self-standing structure and it comprises a dome part (81) and a base part (82) in a water proof structure for covering the body parts of the transmitting unit (4), the receiving unit (2), the transmitting antenna (5) and the receiving antenna (1) and the additional circuit (3) to outwardly protect them.

The power source is not shown.

The battery can be disposed in a part formed by elongating the lower side of the additional circuit (3). In the embodiment, a lead wire (not shown) lead from the base (82) is connected to an outer battery such as a sea water battery (not shown).

It is also possible to equip an lamp for optical indication (not shown) or a speaker for acoustic indication (not shown) in or out of the radar dome case (8) so as to monitor the receiving the radar wave.

The body part is fixed in the radar dome case (8) with the following structure to give high durability and economical advantage. That is, a groove (811) having notch is formed on the inner wall near the lower end of the dome part (81). A fitting (21) having a collar having the corresponding notch which can be fitted to the groove having notch (811) is mounted on the receiving unit (2) as a part of the body part. The additional circuit (3) is fitted on the projects (211) of the fitting (21) to form one body structure.

The assembly of the body parts in the radar dome case (8) will be illustrated.

The collar of the fitting (21) is fitted to the groove (811) having notch to insert the body part in the dome part (81) and to turn it for about 90 degree and the base part (82) is covered. The fitting (21) having the collar is fixed in the groove (811) by fastening the fitting (21) with a screw (822) and a tap screw (212) through an O-ring (824). Then, a seal (823) is fitted on the top of the screw (822). The O-ring (83) is inserted for water-proof between the dome part (81) and the base part (82).

The structure of the radar dome case (8) will be illustrated.

The radar dome case (8) is made of a transparent sphere of waves (radio permeable material) having high impact strength such as a polycarbonate and thickness of the radar dome case is substantially uniform. In order to prevent a trouble caused by rust, the water sealing structure is given between the outer part and the inner part to prevent the exposure of a metallic part.

A transparent window (821) is formed at a part of the radar dome case (8) by eliminating the coating at the window since the polycarbonate is transparent. A hygroscopicity indicator (301) made of a hygroscopic sensitive paper is disposed in the radar dome case (8) so as to monitor the hygroscopic condition in the inner part from the window.

The electric operation of the radar beacon apparatus will be illustrated as reference.

When the radar wave transmitted from the search radar (110), is reached to the radar beacon apparatus, the signal is detected through the receiving antenna (1) and the receiving unit (2). The detected signal is fed to the additional circuit (3) to attain the specific indication such as the generation of the modulated signal of the sweep responding wave for transmitting from the transmitting unit (4); the control of the power supply from the power source to the transmitting unit (4), and the generation of the signal for the indication lamp and the speaker indication for informing the approach of the rescue ship (100) to the sufferers (200) as well as to automatically transmit the specific sweep responding wave.

The specific sweep responding wave is received by the search radar (100) in the rescue ship (100) whereby it is indicated as the dotted line image on the PPI indicator and the position of the sufferers is indicated.

In said embodiment, the transmitting antenna (5) and the receiving antenna (1) are arranged in adjacent position.

Figure 4:
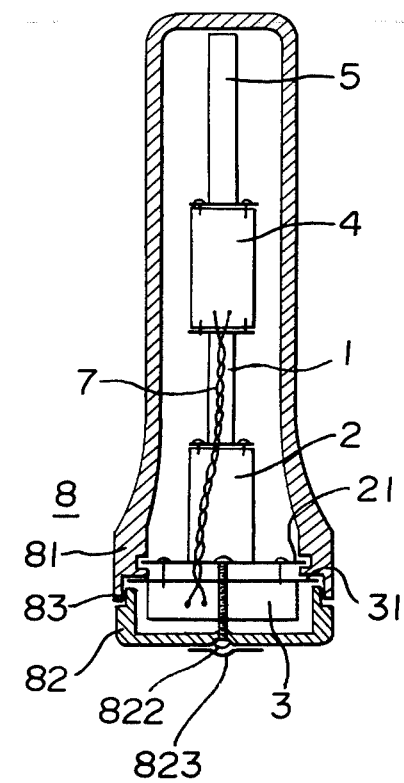
FIG. 4 is a sectional view of the other embodiment of the radar beacon apparatus of the present invention.

As shown in the other embodiment of FIG. 4, it is possible to give the structure that the transmitting unit (4) is connected to the edge surface of the transmitting antenna (5) in the axial direction and the receiving unit (2) and the additional circuit (3) are connected to the edge surface of the receiving antenna (1) in the axial direction and they are disposed in adjacent position on one axial direction.

In this case, the transmitting antenna (5) can be slightly higher whereby the effect for prolonging the transmitting distance of the sweep responding wave can be attained.

When they are arranged in reverse position, the receivable distance for the radar wave can be prolonged.

The former can be effective for improving the function of the rescue system when the receiving sensitivity of the radar beacon apparatus is relatively afforded.

The latter can be effective when the transmitting output is relatively afforded.

In the description, the transmitting unit or the receiving unit is connected to the edge surface of the slot antenna in the axial direction. However, it is not always necessary to connect the transmitting unit or the receiving unit on the edge surface, but also possible to arrange the transmitting unit or the receiving unit near the edge surface of the slot antenna in the axial direction or near the edge surface of the slot antenna in the axial direction through the fitting projected from the E surface or H surface of the wave guide of the slot antenna.

As described above, the radar beacon apparatus of the present invention comprises a long body part of the slot antenna for transmitting and the slot antenna for receiving which are disposed in the substantially same axial direction and the transmitting unit and the receiving unit which are respectively connected to each edge in the axial direction of the slot antenna and the case radar dome made of a transparent sphere of waves which outwardly covers the body part. Accordingly, it is easily brought, stored and equipped with the life buoy. That is, the radar beacon apparatus can be equipped in precise, speedy and easy. The disorder of the antenna pattern and the electric loss in the mutual connections can be significantly reduced. Moreover, the effective height of the antennas can be increased.

The radar beacon apparatus can be miniaturized and can be formed in one body having simple and durable structure by arranging the transmitting antenna, the receiving antenna, the transmitting unit and the receiving unit in the substantial same axial direction.

The air-tightness, the water proof, and the durability of the radar beacon apparatus can be maintained by covering with the radar dome case which is transparent sphere of waves and the inspection of the apparatus can be easily attained.

The transmitting unit, the receiving unit and the antennae for transmitting and receiving can be formed in one body structure and the cost can be reduced.

In accordance with the present invention, the requirement of all of characteristics for the rescue electronic apparatus can be attained to contribute for the speedy, precise rescue activity.

What is claimed is:

1. A radar beacon apparatus which comprises a receiving antenna and a transmitting antenna which are formed by dividing one slot wave guide with a shield; a receiving unit which is fixed on the edge surface of the wave guide in the receiving antenna side of the axial direction and which receives a signal; a transmitting unit which is fixed on the edge surface of the wave guide in the transmitting antenna side of the axial direction and which is controlled by the signal received to generate the responding signal corresponding to the radar wave and to transmit the responding signal to the transmitting antenna to form a body part by the arrangement of the antennae and the units; a dome part which holds the body part and has a groove having notch on the inner wall near the opening and has a long hollow shape; a fitting on which the body part is mounted and which is fitted to the notch of the groove; and a base part which covers the fitting and is faced to the opening of the dome part to fix them.

2. A radar beacon apparatus which comprises a slot antenna for receiving radar wave, a receiving unit which is connected to the edge surface of the receiving antenna in the axial direction to receive the signal received by the antenna; a slot antenna for transmitting whose one edge is connected to the receiving unit; and a transmitting unit which is connected to the other edge surface of the transmitting antenna in the axial direction which is controlled by the signal received to generate the responding signal corresponding to the radar wave and to transmit the responding signal to the transmitting antenna to form a body part by arranging the antennae and the units; a dome part which holds the body part and has a groove having a notch on the inner wall near the opening and has a long hollow shape; a fitting on which the body part is mounted and which is fitted to the notch of the groove; and a base part which covers the fitting and is faced to the opening of the dome part to fix them.

3. A radar beacon apparatus comprising:
a slot receiving antenna having a rectangular cross section and including a plurality of slots formed on the relatively wide rectangular surfaces;
a receiving unit connected to one edge surface of said slot receiving antenna and adapted to receive a signal from said slot receiving antenna;
a separate transmitting unit disposed axially with respect to said slot receiving antenna and adapted to be controlled by a signal from said receiving unit;
a wire electrically connecting said receiving and transmitting units;
a slot transmitting antenna adapted to receive signals from said transmitting unit, said slot transmitting antenna having a rectangular cross section and including slots formed on the relatively wide rectangular surfaces, said slot transmitting antenna being connected at one end to said transmitting unit and further being axially disposed with respect to said slot receiving antenna; and
a radar dome enclosing said apparatus, said dome being composed of a material which is transparent to radar waves.

4. The apparatus of claim 3 wherein the larger dimension of said slots is in a direction parallel to the longitudinal direction of said antennas.

5. A radar beacon apparatus according to claim 3 wherein a body part is formed by arranging said receiving unit, said slot receiving antenna, said slot transmitting antenna and said transmitting unit in order.

6. A radar beacon apparatus according to claim 3 wherein a body part is formed by arranging said slot transmitting antenna, said transmitting unit, said receiving antenna and said receiving unit in order.

7. A radar beacon apparatus according to claim 3 wherein said receiving unit is connected to said edge surface of said slot receiving antenna and said transmitting unit is connected to said edge surface of said slot transmitting antenna in the axial direction.

8. A radar beacon apparatus according to claim 3 wherein the transmitting unit is connected to one of a relatively wide surface and a relatively narrow surface of the slot transmitting antenna and the receiving unit is connected to one of a relatively wide surface and a relatively narrow surface of the slot receiving antenna.

9. A radar beacon apparatus according to claim 3 wherein a wire for connecting the receiving unit to the transmitting unit is disposed along a relatively narrow surface of the slot antenna.

10. A radar beacon apparatus according to claim 3 wherein said radar dome case comprises a dome part and a base part which are sealed in the fitted structure.

11. A radar beacon apparatus according to claim 3 wherein said radar dome case is made of a plastic such as polycarbonate.

12. A radar beacon apparatus according to claim 3 wherein said radar dome case has a window for monitoring the hygroscopic condition in the case.

* * * * *